United States Patent
McDonald

(10) Patent No.: US 10,442,111 B1
(45) Date of Patent: Oct. 15, 2019

(54) BAMBOO LAMINATED LUMBER AND METHOD FOR MANUFACTURING

(71) Applicant: BamCore LLC, Windsor, CA (US)

(72) Inventor: William D McDonald, Santa Rosa, CA (US)

(73) Assignee: BamCore LLC, Windsor, CA (US)

( * ) Notice: Subject to any disclaimer, the term of this patent is extended or adjusted under 35 U.S.C. 154(b) by 0 days.

(21) Appl. No.: 15/212,284

(22) Filed: Jul. 17, 2016

Related U.S. Application Data

(60) Provisional application No. 62/195,292, filed on Jul. 21, 2015.

(51) Int. Cl.
| | |
|---|---|
| *B27M 3/00* | (2006.01) |
| *B32B 21/13* | (2006.01) |
| *B32B 7/12* | (2006.01) |
| *B32B 7/03* | (2019.01) |

(52) U.S. Cl.
CPC ........ *B27M 3/0086* (2013.01); *B27M 3/0066* (2013.01); *B32B 7/03* (2019.01); *B32B 7/12* (2013.01); *B32B 21/13* (2013.01); *Y10T 428/167* (2015.01); *Y10T 428/18* (2015.01); *Y10T 428/195* (2015.01)

(58) Field of Classification Search
CPC ............... Y10T 428/167; Y10T 428/18; Y10T 428/195; B32B 5/12; B32B 21/13; B27M 3/0066; B27J 1/003
See application file for complete search history.

(56) References Cited

U.S. PATENT DOCUMENTS

| | | | | |
|---|---|---|---|---|
| 2,142,305 A | * | 1/1939 | Davis | .................... E04B 1/6125 446/108 |
| 4,012,548 A | * | 3/1977 | Roberti | .................... B27D 1/04 428/106 |
| 2016/0325530 A1 | * | 11/2016 | Slaven, Jr. | .............. B32B 21/08 |

* cited by examiner

*Primary Examiner* — Alexander S Thomas
(74) *Attorney, Agent, or Firm* — Gary Hoenig

(57) ABSTRACT

A bamboo laminated lumber is provided having structural characteristics meeting or exceeding dimensionally equivalent wood based components. The bamboo laminated lumber is formed from bamboo laminated elements laminated and joined together to form dimensional lumber and engineered lumber components. The bamboo laminated lumber element comprises a combination of linear bamboo starter boards being halves of timber bamboo canes pressed flat with the inner pith surfaces laminated together with the grain aligned and skewed bamboo starter boards being halves of timber bamboo canes pressed flat with the inner pith surfaces laminated together with the grain offset from centerline at a specified angle. Top and bottom linear bamboo starter boards are laminated to a central skewed bamboo starter board yielding a bamboo laminated lumber element.

10 Claims, 5 Drawing Sheets

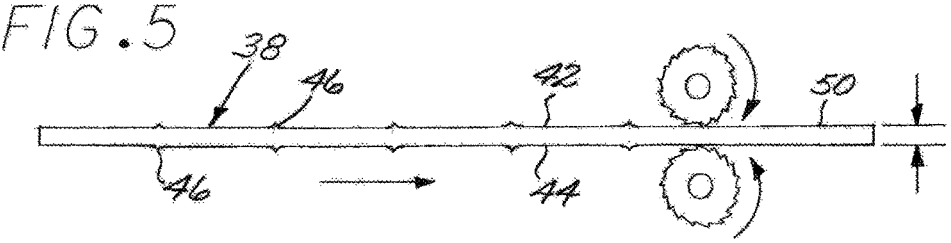
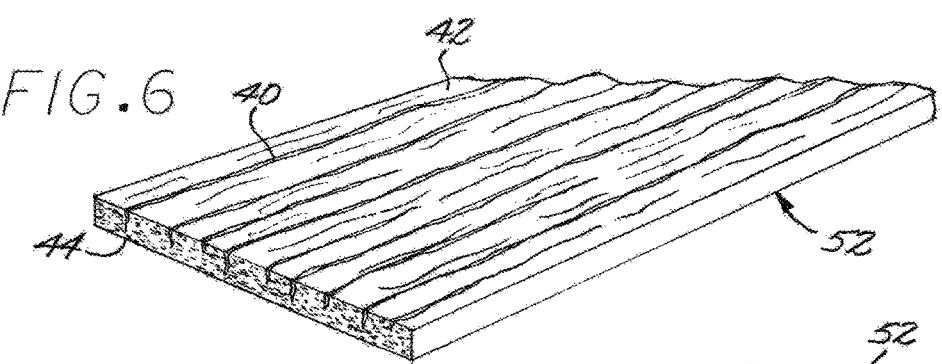
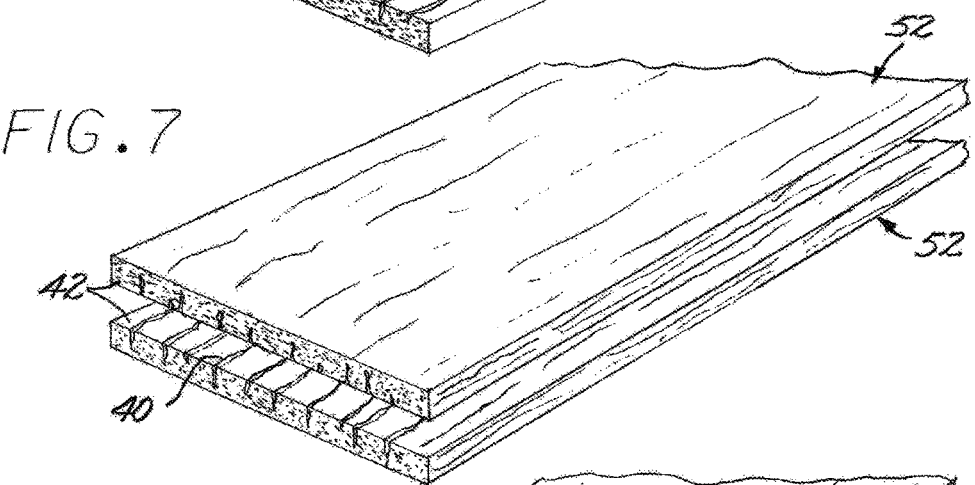
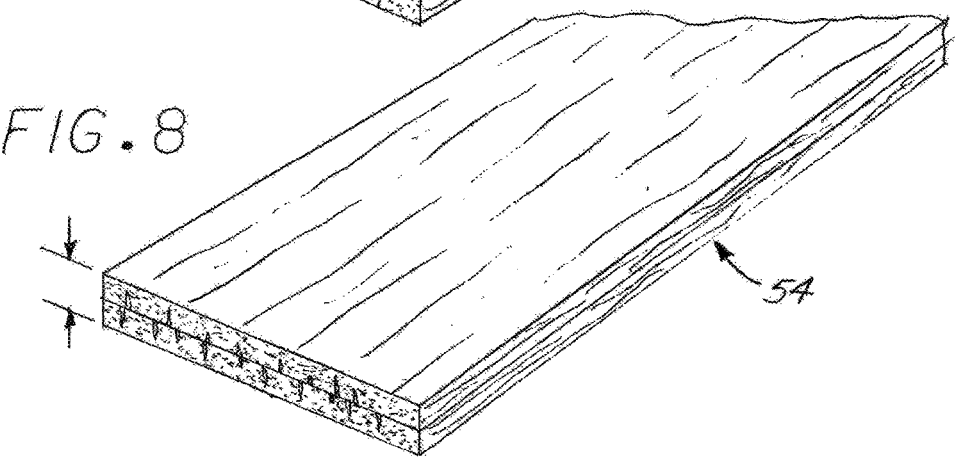

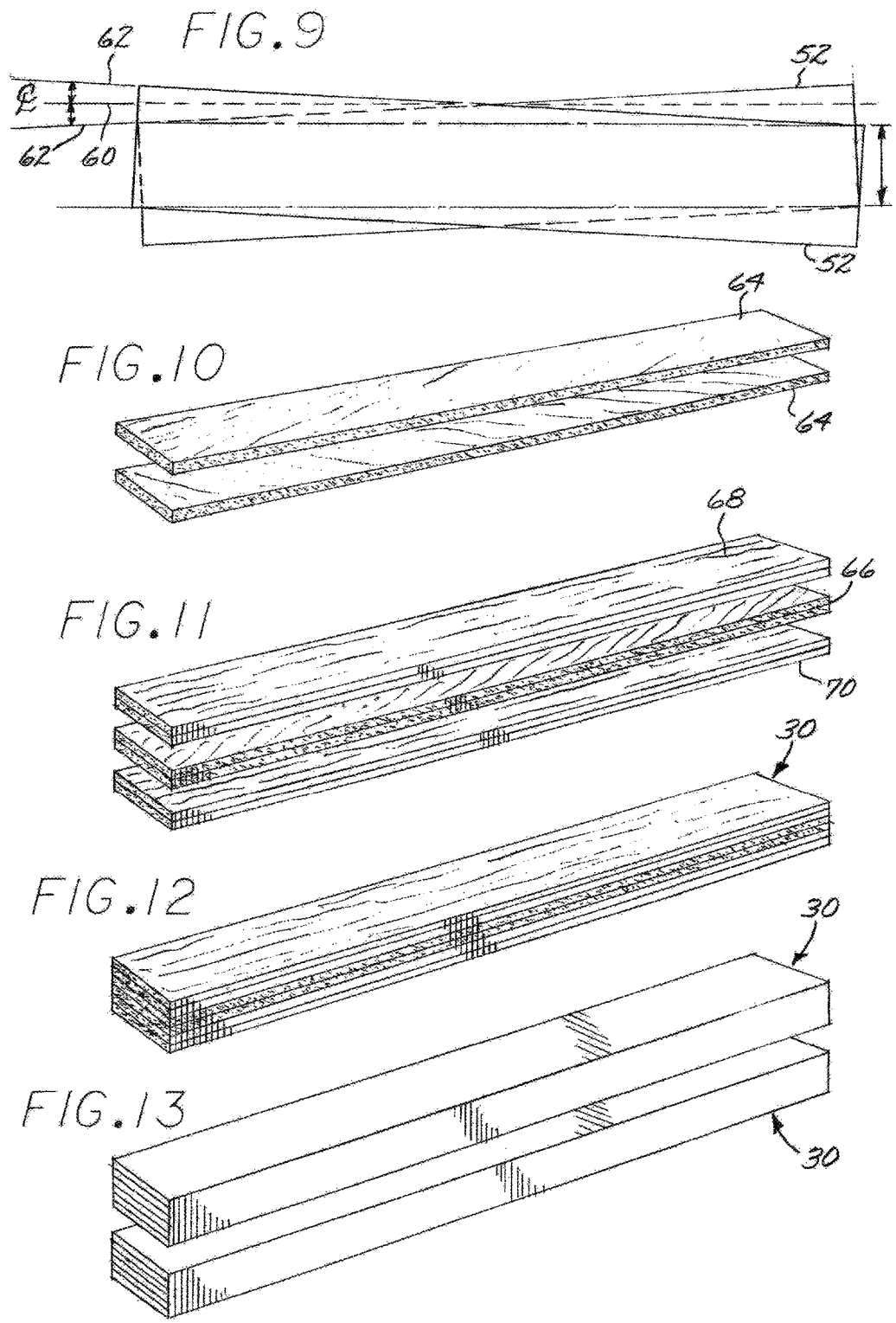

BAMBOO LAMINATED LUMBER AND METHOD FOR MANUFACTURING

This non-provisional utility patent application, filed in the United States Patent and Trademark Office, claims the benefit of U.S. Provisional Patent Application Ser. No. 62/195,292 filed Jul. 21, 2015 which is hereby incorporated by reference.

FIELD OF THE INVENTION

The invention relates to the construction industry and building materials; and, more particularly to a high strength bamboo laminated lumber.

BACKGROUND OF THE INVENTION

Traditional wood based home building techniques typically include the use of stick lumber, sheeting, beams, trusses, engineered lumber products and other components fashioned from wood in the form of lumber or laminated elements. Consequently the demand for wood is high requiring harvesting rates often exceeding the replenishment rates. Timber bamboo, being a grass, is prolific throughout the world and as a construction material has many advantages over wood including material cost, strength, rapid growth, high carbon sequestration and sustainability making timber bamboo an attractive substitute for wood. Use of timber bamboo as a wood replacement is highly desirable; however, the dimensional format of timber bamboo limits the use as a direct substitute.

The longitudinal compression strength of timber bamboo is largely attributed to the orientation of fibers running longitudinally within the culm. The fiber orientation is principally parallel with the exception of some cross fibers in the nodal regions. As typical of plant material, the fibers are bound together with lignin. Although the fiber orientation contributes to the high compression characteristics of a bamboo cane making whole culm bamboo canes well suited for applications such as scaffolding and columns or posts. In longitudinal sheer the load performance of bamboo is reduced by the parallel fiber arrangement. Failure modes of bamboo cane in sheer typically include splitting along the length of the culm wherein the parallel fibers separate. Such a failure mode is also evident when fasteners such as bolts are disposed through the culm resulting in poor pull out performance in sheer along the grain making the use of nature bamboo a poor substitute for wood that comprises additional cross fibers.

Natural bamboo cane, being tubular in shape, has a limited number of applications as a construction material, particularly in western style construction. In order to fabricate traditional dimensional construction material, such as lumber and beams, the bamboo culm is typically processed and formed by shredding, chipping or milling into elements that are recombined as a composite material using resins that can be manipulated and formed into dimensional lumber sized pieces. The processes disrupt or destroy the natural fiber orientation and lignin bonds and therefore the natural strength characteristics of the bamboo cane typically resulting in materials exhibiting lower strength characteristics and heavier weights than the natural bamboo cane. Forming dimensional construction material from bamboo with minimal disruption of the natural bamboo culm maximizes the utilization of the natural bamboo characteristics; however, bamboo culm is typically thin walled thereby limiting the opportunities for cutting dimension construction elements directly from the bamboo culm.

Therefore, what is needed is a bamboo alternative to wood based dimensional lumber and engineered lumber products providing structural characteristics meeting or exceeding wood based products while being sustainable and renewable. In particular, a bamboo lumber and method of manufacturing is needed overcoming disadvantages of tubular bamboo cane and having dimensions equivalent to traditional lumber components, structural characteristics meeting or exceeding wood components, while also being cost efficient thereby providing a direct substitute for traditional wood based components.

SUMMARY OF THE INVENTION

Accordingly, the present invention is directed to a grass based lumber manufactured from timber bamboo, a prolific, fast growing, sustainable and renewable plant. The bamboo lumber according to the present invention is formed by laminating processed bamboo planks prepared from harvested and dried timber bamboo canes cut from three year or older timber bamboo culm. The culm is cut to convenient length canes, the leaves are removed, the cane is split lengthwise into equal halves, the interior nodes are removed, the sugars are leached out, the prepared halves are dried then pressed flat into planks, and the planks are planed to a preselected thickness with the soft inner pith surface preferentially planed to minimize removal of fiber from the hard outer cortex surface.

The bamboo planks are laminated together with the soft inner pith sides facing each other to form a bamboo starter board. With the grains of the planks aligned longitudinally and parallel to each other, a linear bamboo starter board is formed. Additional bamboo planks are laminated together with the soft inner pith surfaces facing each other with the longitudinal grains opposingly offset from the centerline by two to twelve degrees forming a skewed bamboo starter board. A first linear bamboo starter board is next laminated to the top surface of a skewed bamboo starter board and a second linear bamboo starter board is now laminated to the bottom surface of the skewed bamboo starter board, forming a bamboo laminated lumber element according to the present invention.

An objective of the invention is to provide a dimensionally equivalent substitute for wood based lumber. The objective is accomplished by planing the bamboo culm halves to a preselected thickness wherein the assembled bamboo laminated lumber element or multiple stacked bamboo laminated lumber elements has a preselected thickness of dimensional wood lumber. Utilizing timber bamboo having a culm diameter when pressed flat provides sufficient width to form a contiguous bamboo laminated lumber element typically having a width up to ten inches. Long dimensional lengths may be manufactured from long bamboo canes or may be manufactured by joining ends of the bamboo starter board layers together when assembling the bamboo laminated lumber whilst ensuring that the joints do not align between layers. Similarly wider elements may be manufactured by joining the longitudinal edge surfaces of the bamboo starter boards together when assembling the bamboo laminated lumber whilst ensuring that the joints do not align between layers.

A further objective of the invention is to provide a construction element having structural properties the same or better than conventional wood based lumber and laminated beam components having the same dimensions. Material strength tests of the present invention indicate, when compared with wood based materials, equivalent performance and in most cases a significant improvement in performance. Typical test results for a two inch thick by six inch wide bamboo laminated lumber sample include: Flexural strength and stiffness modulus of elasticity 2,333,000 psi, Axial tension strength and stiffness modulus of elasticity 2,774,708 psi and strength 6,700 psi; and, Compression parallel and perpendicular strength 6,049 psi. In particular, by providing a centrally disposed skewed bamboo starter board layer, the opposing offset longitudinal grains of the planks of the skewed bamboo starter board provide an unexpected improvement in bolt pull out sheer tests resulting in Longitudinal sheer strength capacities exceeding 26,000 psi for a two inch thick lumber element. Testing demonstrated similar results uniformly along the length of the element no doubt due to the uniform parallel nature of bamboo providing a consistent grain pattern throughout the bamboo lumber element. The results indicate that the bamboo laminated lumber meets or exceeds the standards for wood lumber of the same dimensions.

In practice, due to the inconsistency of characteristics of natural wood, the wood must be parsed based upon the application. For example, the clarity, dimensional stability, grain structure, and grain density are import factors to consider when manufacturing engineered wood products. The uniformity, specific orientation and order of assemblage of the bamboo planks in the laminates of the bamboo laminated lumber element according to the present invention provide stable and uniform structure minimizing warpage and maximizing strength providing further significant advantages over wood wherein the bamboo lumber is suitable as a direct substitute for both wood lumber and engineered products including LVLs, beams, trusses, etc.

Being a prolific fast growing grass with high carbon sequestration, bamboo provides significant sustainability and renewability thereby providing advantages over wood as a construction material. Additionally harvesting and processing timber is cost efficient. In combination with the dimensional and performance equivalence to wood products, the bamboo laminated lumber of the present invention overcomes many of the disadvantages of the prior art.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 5 is a side elevation view of the bamboo plank being planned to a predetermined thickness wherein material is preferentially removed from the pith side of the plank.

FIG. 6 is a perspective view of the end of the planed bamboo plank of FIG. 5 showing the hard cortex surface being the bottom and the soft pith surface, having substantially longitudinal fissures in the surface, being the top.

FIG. 7 is an expanded perspective view of the end of a linear bamboo starter board prior to assembly comprising two planed bamboo planks disposed with the grain parallel with each other and having the soft pith sides facing each other.

FIG. 8 is a perspective view similar to FIG. 7 illustrating the assembled linear bamboo starter board.

FIG. 9 is a top plan view of two bamboo planks of FIG. 6 disposed skewed longitudinally at a predetermined angle relative to the longitudinal center line of each plank with the soft pith sides adjacently arranged in preparation for assembling a skewed bamboo starter board.

FIG. 10 is an expanded perspective view of the two bamboo planks of FIG. 9 trimmed and disposed with the soft pith sides facing each other and illustrating the offset of the grain of each plank relative to the centerline prior to assemblage of the skewed bamboo starter board.

FIG. 11 is an expanded perspective view of the bamboo laminated lumber according to the present invention illustrating a first linear bamboo starter board linearly disposed adjacent to the top of a skewed bamboo starter board and a second linear bamboo starter board linearly disposed adjacent to the bottom of the skewed bamboo starter board.

FIG. 12 is a perspective view of the assembled bamboo laminated lumber with the first and second linear bamboo starter boards glued to the centrally disposed skewed bamboo starter board.

FIG. 13 is an expanded perspective view of two bamboo laminated lumber elements being arranged for lamination to form a dimensionally larger component.

DETAILED DESCRIPTION OF THE INVENTION

Figure 1:
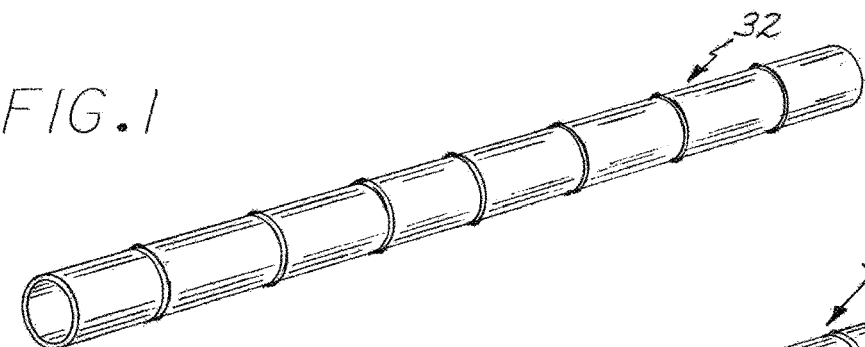
FIG. 1 is a perspective view of the bamboo cane cut from a bamboo culm according to the present invention and is the product of the first step of the manufacturing process.

Although particular embodiments of the invention have been described in detail for purposes of illustration, various modifications may be made without departing from the spirit and scope of the invention. Where examples are presented to illustrate aspects of the invention, these should not be taken as limiting the invention in any respect.

Now referring in greater detail to the various figures of the drawings wherein like reference characters refer to like parts, there is shown in FIG. 12, is a first embodiment of the present invention, a bamboo laminated lumber element, shown at 30, suitable for use as dimensional wood lumber, laminated veneer lumber, or any engineered lumber substitute having structural characteristics and specifications meeting or exceeding wood based products of similar dimensions. The bamboo laminated lumber comprises layers of pressed continuous bamboo culm halves laminated and jointed together to form dimensional construction elements.

Figure 2:
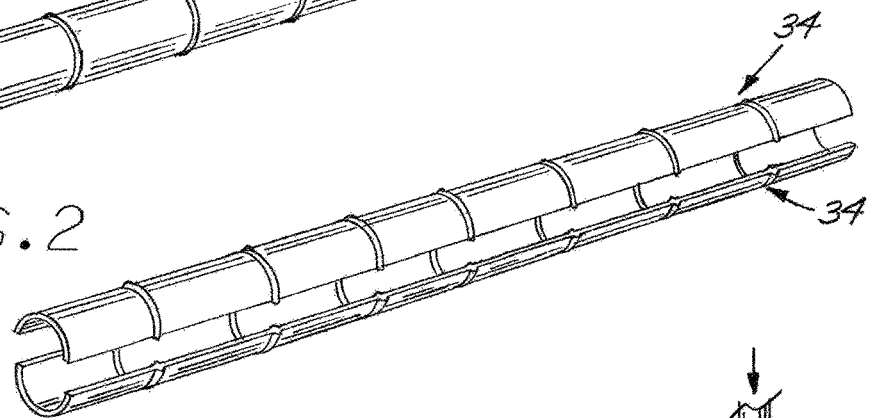
FIG. 2 is a perspective view of the bamboo cane of FIG. 1 wherein the cane is cut longitudinally along the center line of the cane forming two equal halves.
Figure 3:
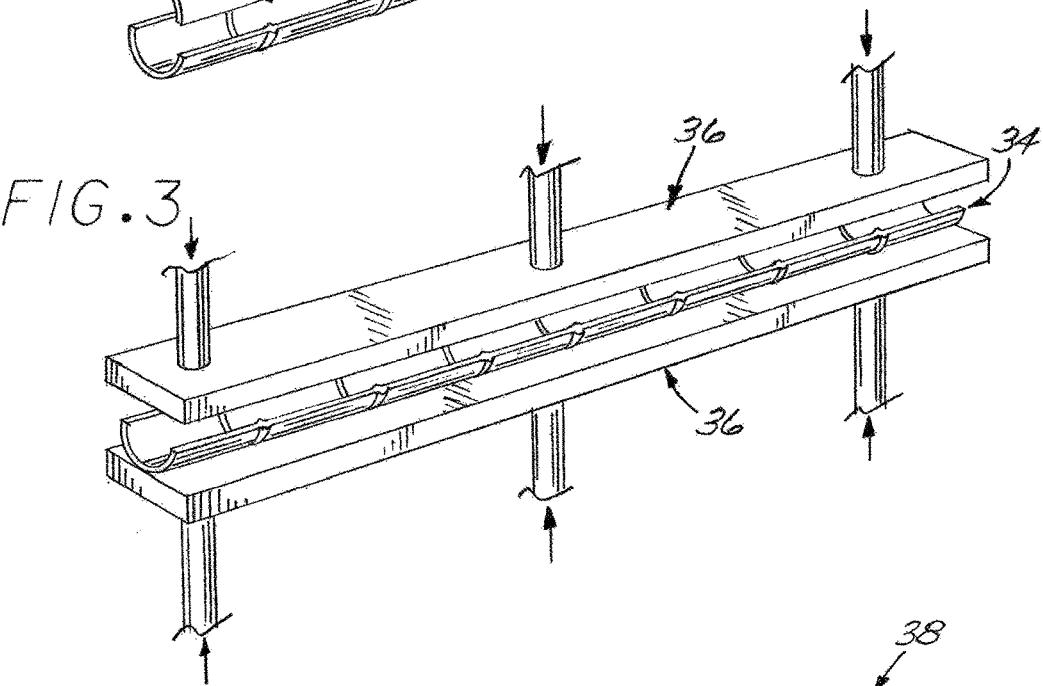
FIG. 3 is a perspective view of a half cane element of FIG. 2 disposed within a press.
Figure 4:
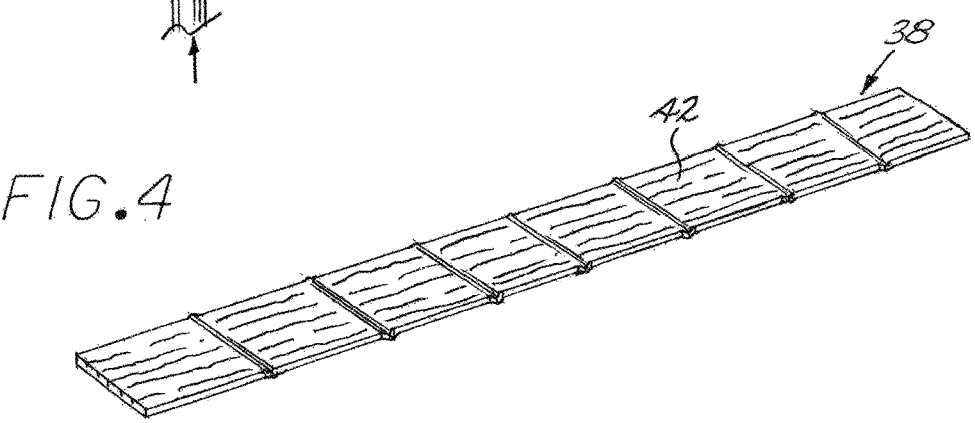
FIG. 4 is a perspective view of a bamboo plank being the bamboo cane half element of FIG. 3 after being pressed illustrating the longitudinal fissure elements in the surface of the plank.

Referring to FIG. 1, the bamboo laminate lumber according to the present invention is formed from timber bamboo canes 32 cut from timber bamboo culms being at least three years old and having at least a 6 inch diameter. The bamboo canes 32 are cut longitudinally along the centerline into equal bamboo cane halves 34 as shown in FIG. 2 wherein the nodes are removed. The bamboo cane halves 34 are processed to remove sugars. The bamboo cane halves 34 are next individually pressed flat uniformly along the length of the bamboo cane half 34 utilizing a hydraulic press 36 wherein the softer pith surface 42 acquires longitudinally oriented fissures 40 along the grain. As the majority of the fibers are longitudinally parallel in timber bamboo, unlike wood, the fissures 40 created during the pressing process follow the grain of the bamboo whilst minimizing damage to the fibers thereby maintaining the inherent strength characteristics of natural bamboo. The process yields a flatten bamboo cane half 38 as illustrated in FIG. 4. The fiber density in the bamboo culm is higher in the regions near the cutaneous outer cortex surface 44. Hence, the flattened bamboo cane half 38 is preferentially planed to a suitable thickness in a manner to preserve the fiber adjacent to the cortex surface. The planing step also removes residual protruding node material 46 as shown in FIG. 5.

The processed and planed flattened bamboo cane half 50 is now the bamboo plank 52 of FIG. 6 wherein the upwardly facing surface 42 is the inner pith surface of the bamboo culm and is characterized by the longitudinal surface fissures 40 and a lower fiber density than the downwardly facing cortex surface possessing a significantly high fiber density. Consequently the upper surface is relatively softer than the lower surface 44.

In order to maximize the strength characteristics of the finished bamboo laminated lumber 30, it is important to arrange the orientation of the various hard and soft sides of the bamboo planks 52 in a specific order of assemblage. Referring now to FIG. 7, two bamboo planks 52 are arranged with the soft sides 42 facing each other. A suitable adhesive is provided between the two planks 52 and the resulting laminated element being a bamboo starter board 54 is created and is illustrated in FIG. 8. As the lignin content is higher on the inner soft surface many adhesive provide a lower binding strength, consequently the fissures 40 of the planks are an important feature providing keys for the adhesive. Note that this is a linear bamboo starter board 54 as the longitudinal grain of the two bamboo planks 52 is parallel aligned. It will be appreciated that the finished dimensional thickness of the linear bamboo starter board 54 is predetermined by the thickness established during planing of the flattened bamboo halves 50 as in FIG. 5.

As a linear bamboo starter board 54 will typically possess a thickness substantially less than customary dimensional lumber, a number of the linear bamboo starter boards 54 may be further laminated together to provide a desired thickness. However, whilst the continuous longitudinal parallel fibers of bamboo provide significant compression and tensile characteristics, the orientation contributes to the weaken of certain characteristics including bolt pull out as the bamboo lignin lacks cross fiber strength resulting in splitting along the fibers. An improvement in bolt pull out performance is achieved by laminating the bamboo planks 52 at an angle relative to the centerline 60 of a finished skewed bamboo starter board 66 as shown in FIG. 9 wherein the grains of the bamboo planks 52 are arrange at an angle offset 62 in the range of two and twelve degrees each from the centerline 60. A four degree offset is preferable. In FIG. 10, trimmed skewed bamboo planks 64 are shown trimmed with the grain appropriately offset. Again, the soft sides of the bamboo planks are laminated together yielding a skewed bamboo starter board 66.

Referring now to FIG. 11 showing an expanded view of the bamboo laminate lumber 30 according to the present invention, a first linear bamboo starter board 68 is positioned above the top surface of a skewed bamboo starter board 66 with a second linear bamboo starter board 70 positioned below the bottom surface of the skewed bamboo starter board 66. The skewed bamboo starter board 66 becomes a middle starter board for a middle layer of the laminate. The starter boards are laminated together forming the finished bamboo laminated lumber 30 of FIG. 12. The presence of the skewed bamboo starter board 66 in the laminate provides bolt pull out strengths exceeding equivalently dimensioned wood products thereby overcoming previous disadvantages of utilizing bamboo. It will again be appreciated that the final thickness of the bamboo laminated lumber 30 is defined by the planed thickness of the bamboo planks of FIG. 5 thereby eliminating the need to plane the finished bamboo laminate lumber again. When utilizing typical bamboo timber species, thickness equal to dimensional wood lumber are readily achievable. Other standard dimensional wood lumber thicknesses may be formed by laminating two or more bamboo laminated lumber 30 elements together as illustrated in FIG. 13.

Figure 14:
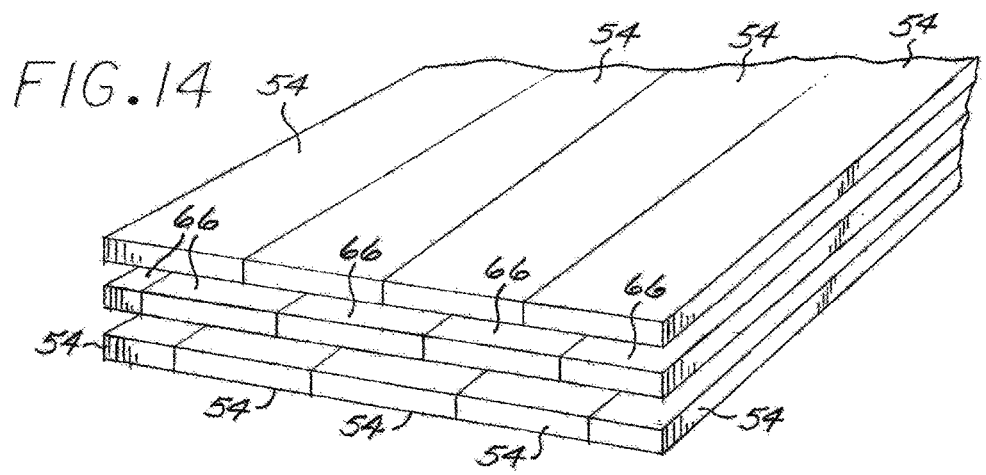
FIG. 14 illustrates a first alternate method of assembling layers of linear and skewed bamboo starter boards forming sheets of bamboo laminate lumber wherein a layer of skewed bamboo starter boards are disposed between a first and second layer of linear bamboo starter boards.
Figure 15:
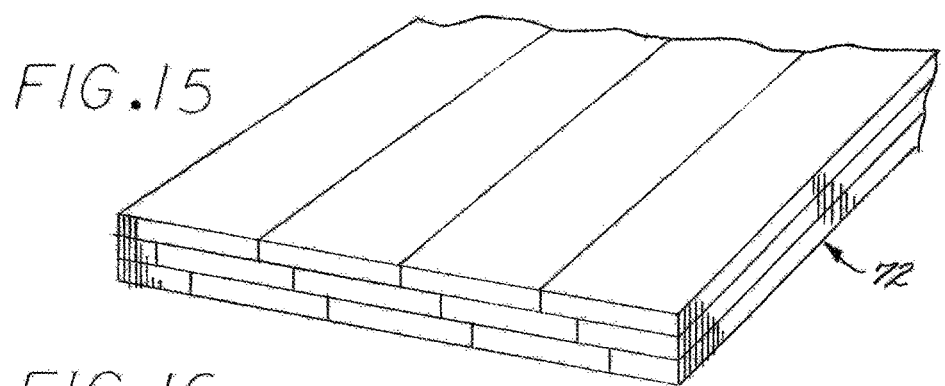
FIG. 15 illustrates an assembled bamboo laminate sheet of FIG. 14 wherein the starter boards are disposed to avoid alignment of the joints between the starter boards.

The width of the bamboo laminated lumber element is limited to the width of the bamboo planks, however, and alternate arrangements of the bamboo planks may be implemented to yield wide bamboo laminated lumber. A first alternate embodiment of the layup is shown in FIG. 14 wherein upper and lower layers of parallel arranged linear bamboo starter boards 54 are laminated to a layer of parallel arranged skewed bamboo starter boards 66. The resulting sheet of bamboo laminated lumber 72, illustrated in FIG. 15, may be manufactured to any desired width. The sheets may be further laminated together to form any desired thickness. Note that the joints between the starter boards must be offset from each other between each layer of bamboo starter boards to avoid weak points in the finished product.

Figure 16:
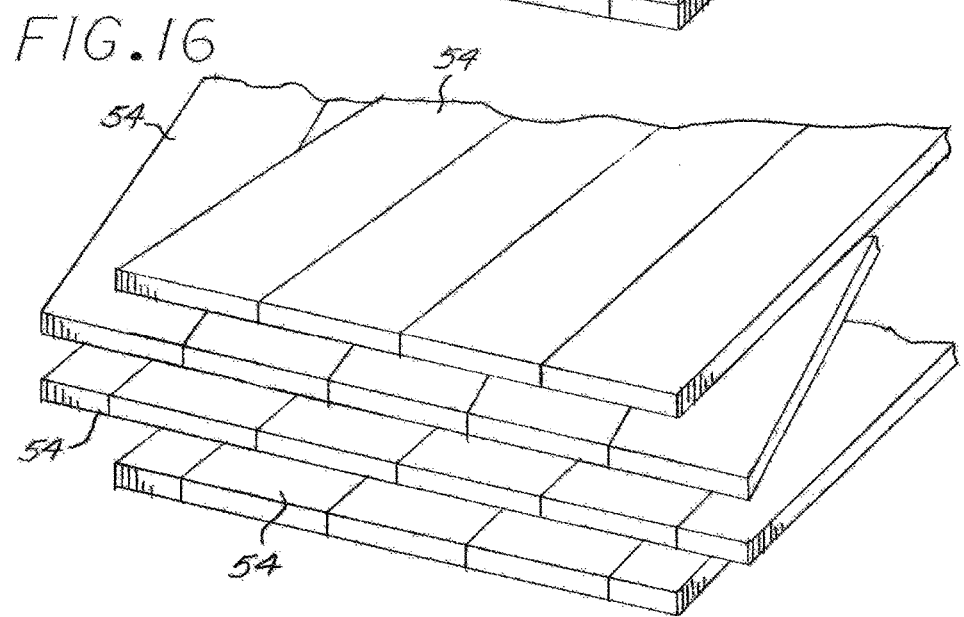
FIG. 16 a second alternate bamboo laminate sheet assemblage formed from layers of linear bamboo starter boards wherein a top and bottom layers of linear bamboo starter boards are arranged with the grain longitudinal and two middle layer of linear bamboo starter boards arranged with the grain angled opposingly offset from the centerline of the assemblage.

In a second alternate embodiment, a sheet of bamboo laminated lumber may be formed exclusively from linear bamboo starter boards 54. Referring to FIG. 16, a sheet of bamboo laminated lumber is formed by providing top and bottom layers of linear bamboo starter boards 54 with grain aligned with the longitudinal centerline and two layers of linear bamboo starter boards 54, each being a middle starter border of a middle layer, disposed between the top and bottom layers and being oriented with the grain offset from the centerline at an angle offset 62 the same as the bamboo planks of a skewed bamboo starter board 66.

Figure 17:
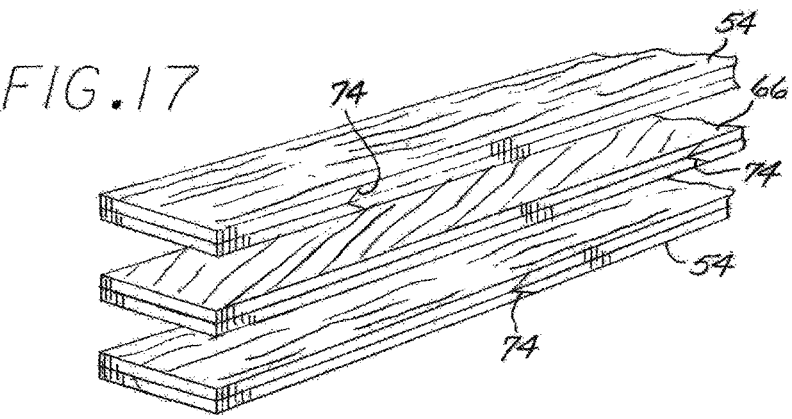
FIG. 17 is a perspective view of a dimensionally long bamboo laminate lumber element illustrating the end joint dispositions wherein the joints in each layer of starter boards are offset from each other.
Figure 18:
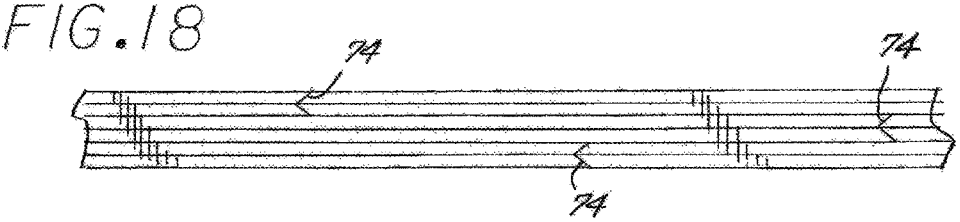
FIG. 18 is a side elevation view of the long bamboo laminate lumber element of FIG. 17.
Figure 19:
FIG. 19 illustrates a bird's mouth joint.
Figure 20:
FIG. 20 illustrates a ship lap joint.
Figure 21:
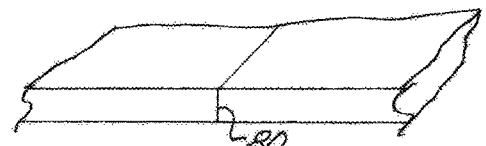
FIG. 21 illustrates a butt joint.
Figure 22:
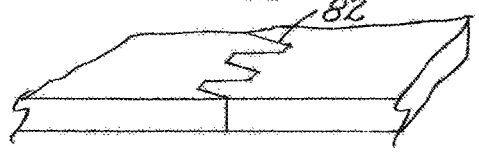
FIG. 22 illustrates a finger joint.
Figure 23:
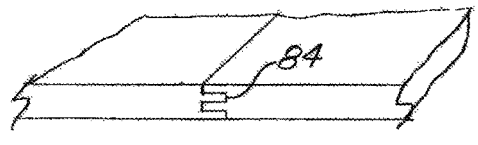
FIG. 23 illustrates a tongue and groove joint.
Figure 24:
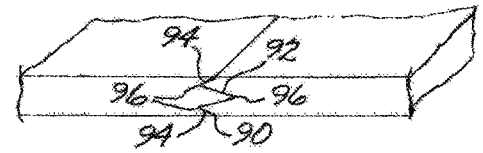
FIG. 24 illustrates a bird's mouth joint optimized for joining bamboo starter boards.

The length of the original timber bamboo cane limits the maximum length of a contiguous bamboo laminated lumber element. The limitation may be overcome by adhesively joining the ends of the bamboo starter boards together as illustrated in FIGS. 17 and 18. It is important to offset the joints 74 relative to adjacent areas to avoid introduction of weak points in the product. Note that the first joint is offset from the second joint and third joint. The typical conventional wood joints may be utilized including the bird's mouth 76 of FIG. 19, the ship lap 78 of FIG. 20, the butt joint 80 of FIG. 21, the finger joint 82 of FIG. 22 and the tongue and groove joint 84 of FIG. 23. Because bamboo behaves somewhat differently from wood when adhesively joined, the joint types do not necessarily yield the same strength as experienced with wood. Consequently, the preferred joint is a variant of a bird's mouth joint 90 is utilized and is illustrated in FIG. 24. The modified bamboo bird's mouth joint profile 90 comprises a V shaped groove centrally 92 and latitudinally aligned in the end of the starter board. Near the top and bottom surfaces of the starter board the cut of the profile is beveled back at angle and continues to the surfaces. This small reverse bevel 94 ensures consistency of the V shaped groove 92 dimensions and contact surfaces in the event that the joint is not properly centered in the thickness of the starter board. All intersections within the profile are relieved 96 as required by the species of bamboo to minimize galling, burning and fiber buildup when the joint profile is cut.

I claim the following:

1. Bamboo laminated lumber, comprising at least one bamboo laminated lumber element having top and bottom surfaces being
   a first linear bamboo starter board, having ends and top and bottom surfaces and a longitudinal centerline, being two flattened timber bamboo culm halves each having a soft pith surface and a hard cutaneous cortex surface and longitudinally parallel grain with the respective soft pith surfaces adhered together and the grain of each halve arranged to align with the linear bamboo starter board longitudinal centerline,
   a middle layer, having top and bottom surfaces and a longitudinal centerline, comprising at least one first middle starter board, having ends and top and bottom surfaces, being two flattened timber bamboo cane halves each having a soft pith surface and a hard cutaneous cortex surface with the respective soft pith surfaces adhered together with the grain of each halve arranged with the grain opposingly offset from the first middle starter board centerline at a first preselected angle selected from the range of 2 to 12 degrees, the top of the middle layer adhered to the bottom surface of the first linear bamboo starter board with the middle layer longitudinal centerline aligned with the grain of the first linear bamboo starter board, and,
   a second linear bamboo starter board, the top of the second linear bamboo starter board adhered to the bottom surface of the middle layer with the grain aligned to the first linear bamboo starter board grain whereby the first and second linear bamboo starter boards and middle layer respective alignment facilitates resistance to longitudinal bolt pullout.

2. The bamboo laminated lumber of claim 1 wherein the ends of like starter boards are joined together with a joint type selected from the group consisting of a bird's mouth joint, a ship lap joint, a butt joint, a finger joint, and a tongue and groove joint.

3. The bamboo laminated lumber of claim 1 wherein the ends of like starter boards are jointed together with a modified bird's mouth joint having a V shaped groove centrally and latitudinally aligned in the end of the bamboo starter board and top and bottom reverse bevels respectively beveled back at angle and respectively continuing to the top and bottom surfaces of the bamboo starter board.

4. The bamboo laminated lumber of claim 1 wherein the bamboo laminated lumber element further has longitudinal sides, and a first bamboo laminated lumber element bottom is adhered to the top of a second bamboo laminated lumber element with the longitudinal sides aligned.

5. The bamboo laminated lumber of claim 1 wherein the bamboo laminated lumber element further has longitudinal sides, and a first bamboo laminated lumber element longitudinal side is adhered to a second bamboo laminated lumber element longitudinal side with the top surfaces aligned.

6. Bamboo laminated lumber, comprising at least one bamboo laminated lumber element having top and bottom surfaces being
   a first linear bamboo starter board, having ends and top and bottom surfaces and a longitudinal centerline, being two flattened timber bamboo culm halves each having a soft pith surface and a hard cutaneous cortex surface and longitudinally parallel grain with the respective soft pith surfaces adhered together and the grain of each halve arranged to align with the linear bamboo starter board longitudinal centerline,
   a middle layer, having top and bottom surfaces and a longitudinal centerline, comprising a second and third linear bamboo starter board, the third linear bamboo starter board top surface being adhered to the second linear bamboo starter board bottom surface and disposed with the second and third linear bamboo starter board centerlines opposingly offset from the middle layer longitudinal centerline at a second preselected angle selected from the range of 2 to 12 degrees; and,
   a fourth linear bamboo starter board, the top of the fourth linear bamboo starter board adhered to the bottom surface of the middle layer with the grain aligned to the first linear bamboo starter board grain whereby the first and second linear bamboo starter boards and middle layer respective alignment facilitates resistance to longitudinal bolt pullout.

7. The bamboo laminated lumber of claim 6 wherein the ends of like starter boards are joined together with a joint type selected from the group consisting of a bird's mouth joint, a ship lap joint, a butt joint, a finger joint, and a tongue and groove joint.

8. The bamboo laminated lumber of claim 6 wherein the ends of like starter boards are jointed together with a modified bird's mouth joint having a V shaped groove centrally and latitudinally aligned in the end of the bamboo starter board and top and bottom reverse bevels respectively beveled back at angle and respectively continuing to the top and bottom surfaces of the bamboo starter board.

9. The bamboo laminated lumber of claim 6 wherein the bamboo laminated lumber element further has longitudinal sides, and a first bamboo laminated lumber element bottom is adhered to the top of a second bamboo laminated lumber element with the longitudinal sides aligned.

10. The bamboo laminated lumber of claim 6 wherein the bamboo laminated lumber element further has longitudinal sides, and a first bamboo laminated lumber element longitudinal side is adhered to a second bamboo laminated lumber element longitudinal side with the top surfaces aligned.

* * * * *